(No Model.)
A. MATTIJETZ.
CULTIVATOR.
No. 510,281. Patented Dec. 5, 1893.
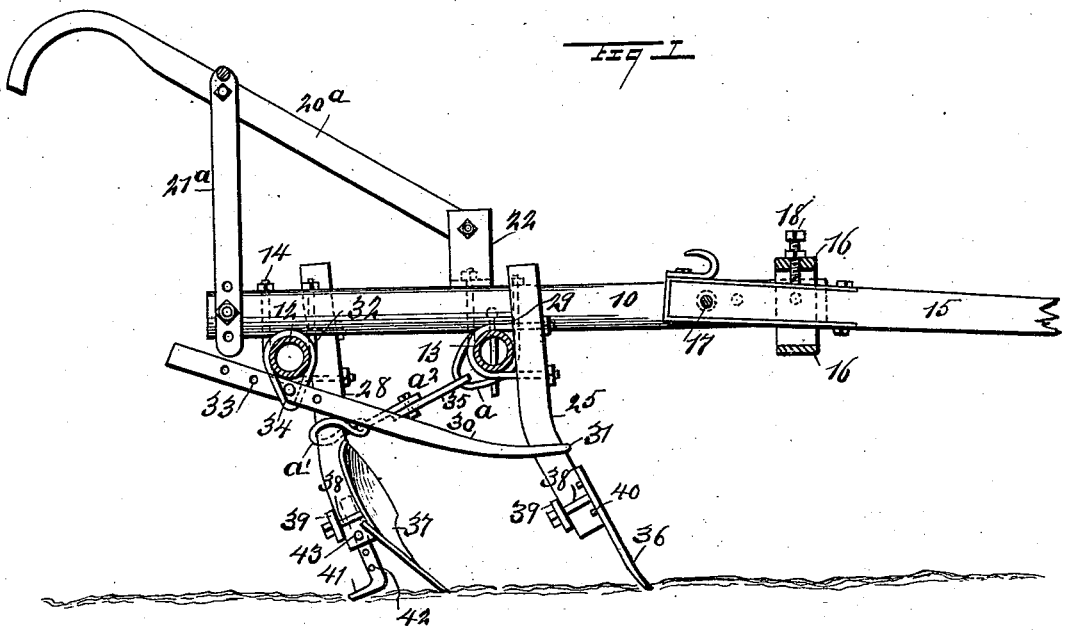
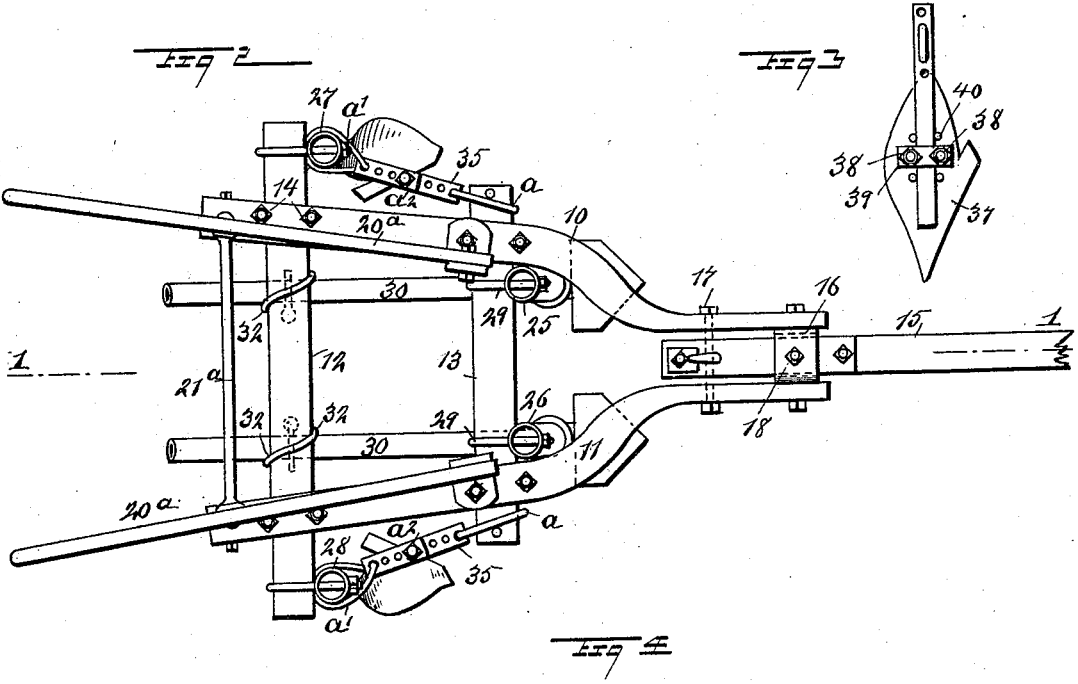
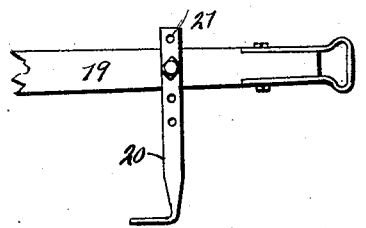
WITNESSES:
H. Walker
C. Sedgwick
INVENTOR
A. Mattijetz
BY Munn & Co.
ATTORNEYS.

UNITED STATES PATENT OFFICE.

ANDREAS MATTIJETZ, OF GIDDINGS, TEXAS.

CULTIVATOR.

SPECIFICATION forming part of Letters Patent No. 510,281, dated December 5, 1893.

Application filed November 17, 1892. Serial No. 452,342. (No model.)

*To all whom it may concern:*

Be it known that I, ANDREAS MATTIJETZ, of Giddings, in the county of Lee and State of Texas, have invented a new and useful Improvement in Cultivators, of which the following is a full, clear, and exact description.

My invention relates to an improvement in cultivators and has for its object to provide a cultivator which will be exceedingly light, durable and economic, which cultivator will have an easy draft and is especially adapted for the cultivation of stump fields, as the cultivator may be manipulated in a convenient and expeditious manner to pass around the stumps, or the entire cultivator may be readily lifted over even high stumps when occasion may demand.

It is a further object of the invention to provide a cultivator in which all of the plow shanks will be adjustable to or from the center line of the frame in order that the cultivator may be adapted for working different kinds of plants.

Another feature of the invention is to provide for the lateral adjustability of the plows upon the plow standards, and to provide a means whereby both the standards and the plows may be maintained in whatever position they may have been placed.

Another feature of the invention consists in rendering the pole or tongue of the cultivator vertically adjustable.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a longitudinal vertical section through the cultivator, the section being taken practically on the line 1—1 of Fig. 2. Fig. 2 is a plan view of the cultivator. Fig. 3 is a rear elevation of one of the plows and its standard detached from the frame or beam of the machine; and Fig. 4 is a side elevation of a tongue adapted to be used, when required, as a substitute for a pole.

The frame of the implement may be said to properly consist of two side beams 10 and 11, which diverge at their rear ends and converge at their forward ends, and cross beams 12 and 13 attached to the side beams, the cross beams being adapted to hold the shovel or plow standards. The side beams and cross beams are connected preferably by means of staples 14, which staples are passed around the cross beams and upward through the side beams, the ends of the staples being threaded for the reception of nuts or equivalent fastening devices. The side and cross beams are made tubular in order that they may be as light as possible. The pole 15, when employed, is located between the forward or converging ends of the side beams 10 and 11; and the inner end of the pole is passed through a yoke 16, utilized for connecting the side beams at their forward ends; and the rear end of the pole, after being passed through the yoke, is pivotally attached to the side beams by means of a bolt 17, or its equivalent. The yoke is of sufficient depth to enable the pole to be raised or lowered while within it; and the pole is held in its adjusted position preferably by means of a set screw 18, passed through the top of the yoke to a bearing against the upper surface of the pole. The vertical adjustment of the pole is provided for, as according to whether the pole is raised or lowered the plows will enter the ground to a slight extent or quite deep.

When a single horse is to be used instead of a team, a tongue 19, shown in Fig. 4, is substituted for the pole, the tongue being provided at its outer end with a clevis, and the inner end of the tongue is pivotally attached to the frame of the cultivator in like manner as the pole, but the tongue is held in its raised or lowered position preferably by means of a shoe 20, provided with an apertured shank 21, the shank being adjustably connected with the tongue. The handles 20ᵃ may be attached to the frame in any suitable or approved manner, but preferably a yoke 21ᵃ is secured to the rear end of the frame, extending upwardly therefrom, and standards 22, are attached to about the central portion of the frame, to which standards the plow handles 20ᵃ, are ordinarily pivotally secured, and the handles are adjustably attached to the yoke, or the yoke is adjustably fastened to the frame, as shown in the drawings.

Two plow standards 25 and 26, are located upon the front cross bars 13 of the frame, between the side bars of the frame; and two other plow standards 27 and 28, are located upon the rear cross bar of the frame, outside of the side bars. All of these standards are adjustable in direction of or away from the center of the machine. All of the standards are made tubular and are clipped upon the cross bars, the clips being preferably staples 29, which are passed around the cross bars and through the standards, the ends of the staples being provided with bolts. By means of this attachment it is evident that the standards may be readily adjusted upon the cross bars of the frame. The two forward standards are prevented from slipping backward, and are given the desired inclination, by means of braces 30, the braces being also made tubular. The forward ends of the braces terminate in eyes 31, through which eyes the standards pass, and the rear ends of the braces are passed through links 32, or their equivalents, suspended from the rear cross bar 12; and the rear ends of the braces are provided with apertures 33, shown in Fig. 1, any of the apertures being adapted to receive a pin 34, the pin being passed through an aperture located within the supporting link of the braces. Thus it will be observed that the braces may be raised or lowered to give whatever inclination found desirable to the forward standards.

Another set of braces 35, is used for staying and giving proper inclination to the rear set of standards. These braces may be of any approved construction, but preferably each brace comprises two links $a$ and $a'$, one of which links is passed over an end of the front cross bar 13, and the other link over one of the rear standards. Each of these links has attached to it an apertured plate, the plate being designated as $a^2$ in the drawings and best shown in Fig. 2; the braces are lengthened and shortened by causing the plates $a^2$ to fold more or less one upon the other, and passing a suitable bolt through registering apertures in the plate. The rear link may be slipped downward or raised upward upon the rear standards so as to give them the desired inclination.

Ordinary shovels 36, are preferably attached to the forward standards, while plows 37, provided with mold boards are secured to the rear standards. All the plows are attached to the standards in the same manner.

Each plow has projected from its rear at each side of the center a pin 38, threaded at its outer end. The pins are adapted to pass one at each side of the standard to which the plow is connected. An apertured plate 39 is utilized to connect the pins of each plow, and the plate is held in place, that is, with a bearing against the rear of the standard, by means of suitable nuts screwed upon the pins. The pins are prevented from slipping laterally upon their standards by forming upon the rear of each plow one or more sets of studs 40, the studs being somewhat angular at their free ends, and the standards pass between these studs, as shown in Fig. 3. It is evident that the plows may be adjusted laterally whenever desired by simply loosening the nuts upon the pins 38 and turning the plows the required distance.

The distance that the rear plows 37 shall enter the ground, is usually regulated by means of shoes 41. These shoes are adapted to engage with the ground; they are located back of the plows and each shoe is provided with an apertured shank 42, the shanks being passed upward into the rear plow standards and held therein by passing pins 43 through the standards and through the shank of the shoe.

It will be observed that a plow constructed in the manner above described will be exceedingly light, yet very strong, and that the plow standards may be adjusted in order that the implement may be used in the cultivation of any kind of plant. Further, it is evident that the implement may be conveniently carried either to the right or to the left, or raised entirely from the ground to clear stumps or other obstructions; it is also evident that the draft is exceedingly light.

Having thus described my invention, I claim as new and desire to secure by Letters Patent—

1. In a cultivator, the combination with a frame formed of side and cross beams, of plow standards secured to the cross beams, braces having eyes in their ends to receive the standards, links secured to the cross beams, and means for adjustably connecting the braces to the links, substantially as described.

2. In a cultivator, the combination with the side beams of the frame having their forward ends spaced apart and connected by a yoke, of a pole or tongue pivoted between the said beams and projecting through the yoke, and a set screw passing through the yoke and bearing against the pole or tongue, substantially as described.

3. A cultivator, comprising a frame composed of tubular side and cross beams, tubular plow standards clipped to the cross beams, braces provided with eyes to receive the tubular standards and adjustably connected with the cross beams, handles adjustably secured to the frame, and a pole or tongue pivoted to the frame and vertically adjustable, substantially as herein shown and described.

ANDREAS MATTIJETZ.

Witnesses:
I. J. FARISS,
J. S. HILLSMAN.